United States Patent
Jung et al.

(10) Patent No.: US 11,797,210 B2
(45) Date of Patent: Oct. 24, 2023

(54) METHOD OF OPERATING MEMORY DEVICE AND HOST DEVICE, AND MEMORY SYSTEM INCLUDING PARTITIONING PURGE REGION RESPONSIVE TO PURGE INFORMATION

(71) Applicant: SAMSUNG ELECTRONICS CO., LTD., Suwon-si (KR)

(72) Inventors: Dae Jin Jung, Hwaseong-si (KR); Dong-Min Kim, Hwaseong-si (KR); Jeong-Woo Park, Hwaseong-si (KR); Kyoung Back Lee, Hwaseong-si (KR)

(73) Assignee: Samsung Electronics Co., Ltd.

( * ) Notice: Subject to any disclaimer, the term of this patent is extended or adjusted under 35 U.S.C. 154(b) by 98 days.

(21) Appl. No.: 17/369,884

(22) Filed: Jul. 7, 2021

(65) Prior Publication Data

US 2022/0083249 A1 Mar. 17, 2022

(30) Foreign Application Priority Data

Sep. 14, 2020 (KR) .................. 10-2020-0117486
Nov. 24, 2020 (KR) .................. 10-2020-0158489

(51) Int. Cl.
*G06F 3/06* (2006.01)
(52) U.S. Cl.
CPC .......... *G06F 3/0644* (2013.01); *G06F 3/0604* (2013.01); *G06F 3/0679* (2013.01)
(58) Field of Classification Search
CPC ..... G06F 3/0644; G06F 3/0679; G06F 3/0652
See application file for complete search history.

(56) References Cited

U.S. PATENT DOCUMENTS

| | | | |
|---|---|---|---|
| 8,000,153 B2 | 8/2011 | Salessi et al. | |
| 9,015,401 B2 | 4/2015 | Hars et al. | |
| 2014/0215129 A1* | 7/2014 | Kuzmin | G06F 12/0246 711/103 |
| 2015/0074368 A1 | 3/2015 | Islam et al. | |
| 2015/0278088 A1 | 10/2015 | Ito | |
| 2019/0121570 A1* | 4/2019 | Kim | G06F 3/0688 |
| 2021/0208808 A1* | 7/2021 | Gupta | G06F 3/0673 |
| 2022/0075523 A1* | 3/2022 | Muthukumaran | G06F 3/0619 |

FOREIGN PATENT DOCUMENTS

| | | |
|---|---|---|
| JP | 2010176399 A | 8/2010 |
| JP | 2017126320 A | 7/2017 |
| KR | 20190045697 A | 5/2019 |

* cited by examiner

*Primary Examiner* — David Yi
*Assistant Examiner* — Nicholas A. Paperno
(74) *Attorney, Agent, or Firm* — Fish & Richardson P.C.

(57) ABSTRACT

A memory system includes a host device including a host controller, and a memory device including a device controller and a non-volatile storage including a purge region and a memory region. The device controller communicates purge information associated with the purge region and including size information of the purge region. The host controller communicates a request for generating a first partition for a first logical unit in the memory region, and communicates a request for generating a second partition for a second logical unit in the purge region in response to the size information of the purge region.

12 Claims, 11 Drawing Sheets

| wSupportedMemoryTypes |
|---|
| 00h: Normal Memory |
| ... |
| 06h: Enhanced memory type 4 |
| 07h: Enhanced Removal Memory Type |

FIG. 7

| | | GEOMETRY DESCRIPTOR | |
|---|---|---|---|
| Size | Name | Value | Descriptor |
| 4 | dEnhancedRemovalMaxNAllocU | Device spcific | Max Number of Allocation Units for the Enhanced Removal memory type. Maximum available quantity of Enhanced memory Removal type for the entire device Value expressed in number of Allocation Unit |
| 2 | wEnhancedRemovalCapAdjFac | Device spcific | Capacity Adjustment Factor for the Enhanced memory Removal type. This parameter is the ratio between the capacity obtained with the Normal memory type and the capacity obtained with the Enhanced memory Removal type for the same amout of allocation units. CapacityAdjFactor = CapacityNormalMem / CapacityEnhancedRemoval wEnhancedRemovalCapAdjFac = INTEGER(256 x CapacityAdjFactor) |

FIG. 12

| | Transaction Specific Fields for SET FLAG OPCODE | | |
|---|---|---|---|
| 12<br>06h | 13<br>FLAG IDN | 14<br>INDEX | 15<br>SELECTOR |
| 16<br>Reserved | 17<br>Reserved | 18<br>Reserved | 19<br>Reserved |

METHOD OF OPERATING MEMORY DEVICE AND HOST DEVICE, AND MEMORY SYSTEM INCLUDING PARTITIONING PURGE REGION RESPONSIVE TO PURGE INFORMATION

This application claims priority from Korean Patent Application No. 10-2020-0117486 filed on Sep. 14, 2020 and Korean Patent Application No. 10-2020-0158489 filed on Nov. 24, 2020, the collective subject matter of which is hereby incorporated by reference.

BACKGROUND

1. Field of the Disclosure

The inventive concept relates generally to methods of operating a memory device and a host device, and a memory system.

2. Description of the Related Art

In memory devices, a purge operation is an operation that physically deletes data (usually sensitive data) from a storage region. However, such sensitive data may have an unmapped state due to the lack of logical-to-physical (L2P) mapping information in the memory device.

As a result of this unmapped data state, a purge operation may require an inordinate amount of processing time, since it is necessary to identify any unmapped portion of the entirety of the storage region in the memory device, and only then perform the purge operation for all data identified in the storage region. Unfortunately, as the data storage capacity of contemporary and emerging memory device continues to increase, the execution time for purge operations has also increased. Therefore, there is a need for methods capable of efficiently performing a purge operation.

SUMMARY

Aspects of the inventive concept provide methods of efficiently operating a memory device in relation to the performing of purge operations. Such methods may relate to memory systems, as well as host devices and/or memory devices in the memory systems.

In one aspect, embodiments of the inventive concept provide a method of operating a memory device in a memory system including a host device and the memory device, wherein the memory device includes a non-volatile storage including a purge region and a memory region. The method may include; communicating purge information associated with the purge region in response to a request from the host device for purge information, allocating a first partition for a first logical unit in the purge region in response to a request from the host device for generating the first partition for the first logical unit in the purge region, and performing a purge operation on the first partition or an entirety of the purge region in response to a purge request from the host device including information indicating a target region to be purged.

In another aspect, embodiments of the inventive concept provide a method of operating a host device in a memory system including a memory device including a non-volatile storage including a purge region and a memory region. The method may include; receiving purge information associated with the purge region from the memory device, communicating a request to the memory device for generating a first partition for a first logical unit in the purge region in response to the purge information, communicating purge data to the memory device to be stored in the first partition, and communicating a purge request to the memory device including information indicating the first partition or an entirety of the purge region.

In another aspect, embodiments of the inventive concept provide a memory system including; a host device including a host controller, and a memory device including a device controller and a non-volatile storage including a purge region and a memory region. The device controller is configured to communicate to the host controller purge information associated with the purge region and including size information of the purge region. The host controller is configured to communicate to the device controller a request for generating a first partition for a first logical unit in the memory region, and communicate to the device controller a request for generating a second partition for a second logical unit in the purge region in response to the size information of the purge region. A purge operation performed by the memory device for an entirety of the purge region is completed within a defined purge time.

It should be noted that aspects of the inventive concept are not limited to the above-described aspect and other aspect will be apparent to those skilled in the art upon consideration of the following descriptions.

BRIEF DESCRIPTION OF THE DRAWINGS

The above and other aspects and features of the inventive concept will become more apparent to those skilled in the art upon consideration of the following written description together with the accompanying drawings, in which:

FIG. 5 is a block diagram further illustrating in one example a configuration of the NVM storage 220 including multiple storage regions recognizable by the UFS device controller 210 and the UFS host controller 110 of FIG. 1; and FIGS. 6, 7, 8, 9, 10, 11 and 12 are related diagrams illustrating in one example a purge operation that may be performed in relation to memory systems according to embodiments of the inventive concept.

DETAILED DESCRIPTION

Throughout the written description and drawings, like reference numbers and labels are used to denote like or similar elements, components and features. Hereinafter, several embodiments of the inventive concept will be described with reference to the accompanying drawings.

Figure 1:
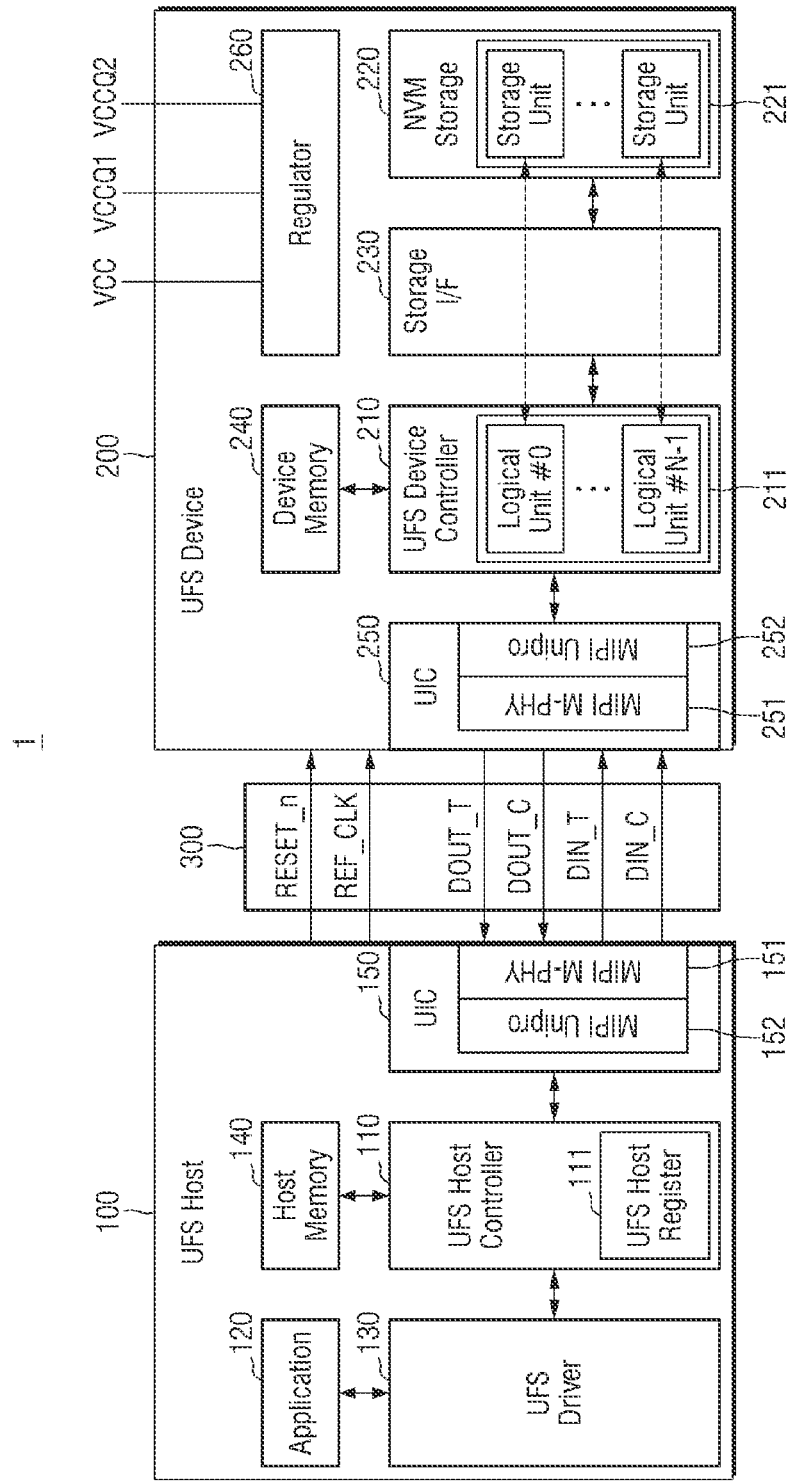
FIG. 1 is a block diagram illustrating a memory system according to embodiments of the inventive concept.

Figure (FIG. 1 is a block diagram illustrating a memory system according to embodiments of the inventive concept.

Hereinafter, an exemplary memory system consistent with embodiments of the inventive concept will be described in the context of a memory system compliant with the Universal Flash Storage (UFS) standard promulgated by the Joint Electron Device Engineering Council (JEDEC) (hereafter, "the UFS system 1"). However, those skilled in the art will recognize that the scope of the inventive concept is not limited to only this exemplary context, but rather, different aspects of the illustrated memory system may be variously modified.

Referring to FIG. 1, the UFS system 1 may include a host device 100, a memory device 200, and a UFS interface 300, wherein the host device 100 and the memory device 200 are connected through the UFS interface 300. In some embodiments, the host device 100 may be implemented, wholly or in part, as an application processor.

The host device 100 may include a UFS host controller 110, an application 120, a UFS driver 130, a host memory 140, and a UFS interconnect (UIC) layer 150.

The memory device 200 may include a UFS device controller 210, a non-volatile memory (NVM) storage 220, a storage interface 230, a device memory 240, a UIC layer 250, and a regulator 260.

The NVM storage 220 may be include multiple storage units 221, which may include one or more of a vertical NAND-type (V-NAND) flash memory having a two-dimensional (2D) and/or a three-dimensional (3D) structure, a phase change random access memory (PRAM), a resistive random access memories (RRAM), and the like.

As noted above, the UFS device controller 210 and the NVM storage 220 are connected through the storage interface 230. Here, the storage interface 230 may be implemented in a manner consistent with one or more standard protocols, such as a Toggle or Open NAND Flash Interface Working Group (ONFI) protocol. In this regard, interoperation between the UFS device controller 210 and the NVM storage 220 will be described hereafter assuming the use of the Toggle protocol.

The application 120 may include program(s) controlling the communication of request(s), command(s), control signal(s), address(es) and/or data between the UFS host 100 and the memory device 200. In response to these request(s), command(s), control signal(s), address(es) and/or data, the memory device 200 may perform one or more data access operations (e.g., read operations, write (or program) operations, erase operations, and various housekeeping operations. For example, the application 120 may communicate an input-output request (IOR) to the UFS driver 130 in order to variously input data to and/or output data from the memory device 200. Thus, the IOR may include a data read request, a data write request, and/or a data erase request, but embodiments of the inventive concept is not limited thereto.

The UFS driver 130 may manage the UFS host controller 110 using (e.g.) a UFS host controller interface (UFS-HCI). Accordingly, the UFS driver 130 may convert the IOR received from the application 120 into a competent UFS command—as defined by the UFS standard—and then communicate the resulting UFS command to the UFS host controller 110. In some embodiments, a single IOR may be converted into multiple UFS commands In this regard, the UFS command(s) may be various commands defined by the SCSI standard and/or other commands defined by the UFS standard.

Once provided (or converted) by the UFS driver 130, the UFS host controller 110 may communicate the UFS commands to the UIC layer 250 of the memory device 200 through the UIC layer 150 and the UFS interface 300. During this communication process, a UFS host register 111 associated with the UFS host controller 110 may serve as a command queue (CQ).

The UIC layer 150 in the host device 100 may include a Mobile Industry Processor Interface (MIPI) M-PHY 151 and a MIPI UniPro 152. Analogously, the UIC layer 250 in the memory device 200 may include a MIPI M-PHY 251 and a MIPI UniPro 252.

The UFS interface 300 may include a single line (hereafter, "line") for communicating a reference clock (REF_CLK), a line for communicating a hardware reset signal (RESET_n) for the memory device 200, a pair of lines for communicating a differential input signal pair (DIN_T and DIN_C), and a pair of lines for communicating a differential output signal pair (DOUT_T and DOUT_C).

In some embodiments, the frequency of the reference clock provided from the host device 100 to the memory device 200 may be one selected from a group of four frequencies (i.e., 19.2 MHz, 26 MHz, 38.4 MHz, and 52 MHz). In this regard, the host device 100 may change the frequency of the reference clock during various operations. That is, the host device 100 may change the frequency of the reference clock during data communication (e.g., data transmission, data reception or data transmission and reception) between the host device 100 and the memory device 200.

The memory device 200 may generate (or derive) one or more internal clock signals (hereafter, "clocks") having various frequencies from the reference clock provided by the host device 100, using a phase-locked loop (PLL) or the like. In this manner, the host device 100 may define (or "set") a rate at which data is communicated (hereafter, "data rate") between the host device 100 and the memory device 200 in relation to the frequency of the reference clock and/or one or more clocks.

The UFS interface 300 may support multiple data communication "lanes," wherein each lane may be implemented as a pair of differential lines. In some embodiments, the UFS interface 300 may include one or more reception lanes and one or more transmission lanes. In the illustrated example of FIG. 1, the pair of lines communicating the differential input signal pair DIN_T and DIN_C may constitute a reception lane, and the pair of lines communicating the differential output signal pair DOUT_T and DOUT_C may constitute a transmission lane, however embodiments of the inventive concept may include any reasonable arrangement of transmission lane(s) and/or reception lane(s).

Data may be communicated through a reception lane or a transmission lane using a serial communication protocol. In some embodiments wherein the reception lane and the transmission lane are separated, it may be possible establish communication between the host device 100 and the memory device 200 using a full-duplex communication method. That is, the memory device 200 may communicate data to the host device 100 through the transmission lane while simultaneously (i.e., overlapping at least in part) receiving data from the host device 100 through the reception lane. Alternately or additionally, various "control data" (e.g., request(s), command(s), control signal(s) and/or address(es)) may be communicated from the host device 100 to the memory device 200, "write data" or "program data" (i.e., data to-be-stored in the NVM storage 220 of the memory device 200) may be communicated from the host device 100 to the memory device 200, and/or read data (i.e., data retrieved from the NVM storage 220) may be communicated using the same lane. Accordingly, it is not necessary to provide a separate lane for data communication in addition to the reception lane(s) and the transmission lane(s) between the host device 100 and the memory device 200.

The UFS device controller 210 of the memory device 200 may control the overall operation of the memory device 200.

The UFS device controller 210 may manage the NVM storage 220 using a logical unit (LU) 211 which is a logical data storage unit. The number of LUs 211 (e.g., 8) may be used in this regard.

The UFS device controller 210 may include a flash translation layer (FTL), and may use address mapping information provided by the FTL to convert a logical data address (e.g., a logical block address (LBA)) received from the host device 100 into a corresponding physical data address (e.g., a physical block address (PBA) or a physical page number (PPN)). In the UFS system 1 of FIG. 1, it is assumed that a logical block used to store data may have a size defined according to a predetermined range (e.g., a minimum size of 4 Kbytes).

When control data provided by the host device 100 is applied to the memory device 200 through the UIC layer 250, the UFS device controller 210 may perform an operation corresponding to a control data, and once the operation is complete, the UFS device controller 210 may communicate (or return) a corresponding response to the host device 100.

For example, when the host device 100 intends to store (i.e., write or program) user data in the memory device 200, the host device 100 may communicate a data write command to the memory device 200. Once the host device 100 receives a corresponding response from the memory device 200 indicating that the memory device is ready, the user data may be communicated from the host device 100 to the memory device 200. In this regard, the UFS device controller 210 may temporarily store the user data in the device memory 240 and may store the user data temporarily stored in the device memory 240 at a location of the NVM storage 220 indicated by the address mapping information provided by the FTL.

As another example, when the host device 100 intends to read user data stored in the memory device 200, the host device 100 may communicate a data read command to the memory device 200. When the memory device 200 receives the command, the UFS device controller 210 may read the user data from the NVM storage 220 in response to the data read command and temporarily store the read user data in the device memory 240. During the read operation, the UFS device controller 210 may utilize an embedded error correction code (ECC) circuit (not shown in FIG. 1) to detect and/or correct error(s) in the user data read from the NVM storage 220. Thereafter, the UFS device controller 210 may communicate the user data temporarily stored in the device memory 240 to the host device 100.

In some embodiments, the UFS device controller 210 may further include an advanced encryption standard (AES) circuit (not shown in FIG. 1) which may be used to encrypt and/or decrypt the data received by the UFS device controller 210 using a symmetric-key algorithm.

The host device 100 may store commands to-be-communicated to the memory device 200 in the UFS host register 111 (e.g., a CQ) according to an order of the transmission, and then communicate the commands to the memory device 200 in this order. In this case, even when a command previously transmitted is still being processed by the memory device 200 (e.g., during a time period in which the host device 100 waits to receive notification that the previously transmitted command has been processed by the memory device 200), the host device 100 may communicate a next command pending in the CQ to the memory device 200. Accordingly, the memory device 200 may receive the next command from the host device 100 even before the previously transmitted command has been fully processed.

In this regard, up to a maximum number of commands (e.g., a queue depth of e.g., 32) may be stored in the CQ. In some embodiments, the CQ may be implemented as a circular queue in which a head pointer and a tail pointer respectively indicate a start and an end of a sequence of commands stored in the queue.

Each of the storage units 221 of the NVM storage 220 may include a memory cell array and a control circuit for controlling operation of the memory cell array. The memory cell array may be a 2D memory cell array or a 3D memory cell array. Each memory cell array may include memory cells in which each memory cell may be configured to store a single bit of data (e.g., single level cell (SLC)) or two or more bits of data (e.g., a multiple level cell (MLC), such as a triple level cell (TLC), a quadruple level cell (QLC), etc.). In some embodiments, a 3D memory cell array may include vertical NAND strings which are vertically oriented, such that at least one memory cell is positioned vertically above another memory cell.

Certain voltages (e.g., VCC, VCCQ1, VCCQ2, etc.) may be applied to the memory device 200 as internal power voltages. For example, the voltage VCC may be a main power voltage for the memory device 200 having a level ranging from 2.4 to 3.6 V. The voltage VCCQ1 may be a low range power voltage (e.g., mainly for the UFS device controller 210) having a level ranging from 1.14 to 1.26 V. The voltage VCCQ2 may be an intermediate power voltage (e.g., mainly for I/O interface(s), such as the MIPI M-PHY 251) having a level ranging between VCC and VCCQ1 (e.g., between 1.7 to 1.95 V). The power voltages may pass through the regulator 260 and may be supplied to various components of the memory device 200. The regulator 260 may be implemented as a set of unit regulators respectively connected to different ones of the above-described power voltages.

Figure 2:
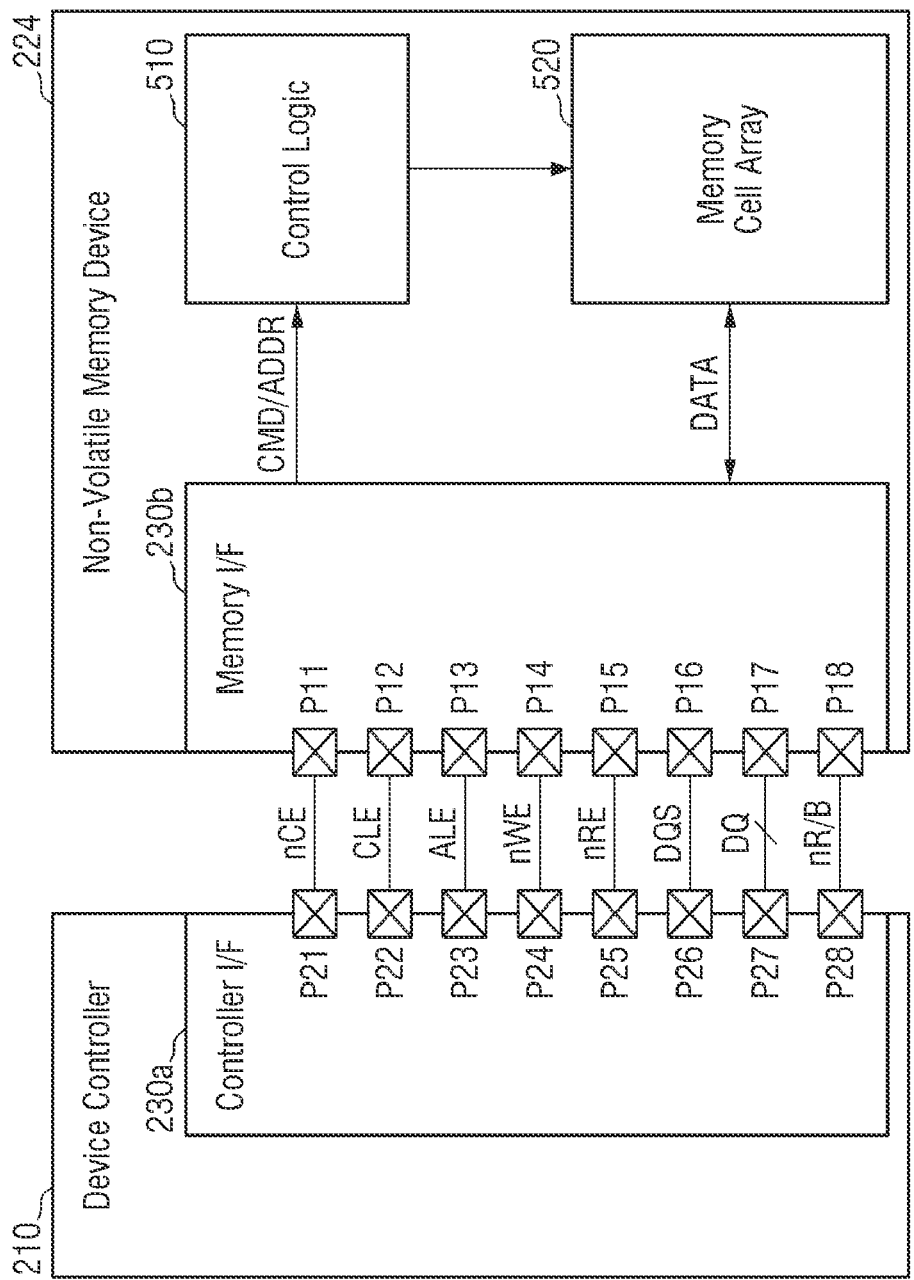
FIG. 2 is a block diagram further illustrating a configuration of the UFS device controller 210, the storage interface 230, and a non-volatile memory device 224, as an example of the NVM storage 220 of FIG. 1.

FIG. 2 is a block diagram further illustrating a configuration of the UFS device controller 210, the storage interface 230, and a non-volatile memory device 224, as one example of a memory device 221 of the NVM storage 220. Here, the storage interface 230 is assumed to include a controller interface circuit 230a and a memory interface circuit 230b.

The memory device 224 is further assumed to include first to eighth pins P11 to P18, the memory interface circuit 230b, a control logic circuit 510, and a memory cell array 520.

The memory interface circuit 230b may receive a chip enable signal nCE from the UFS device controller 210 through the first pin P11. The memory interface circuit 230b may communicate (e.g., transmit and/or receive) signals with the UFS device controller 210 through the second to eighth pins P12 to P18 in response to the chip enable signal nCE. For example, when the chip enable signal nCE is in an enable state (e.g., a low level), the memory interface circuit 230b may communicate signals with the UFS device controller 210 through the second to eighth pins P12 to P18.

The memory interface circuit 230b may also receive a command latch enable signal CLE, an address latch enable signal ALE, and a write enable signal nWE from the UFS device controller 210 through the second to fourth pins P12 to P14. The memory interface circuit 230b may receive a data signal DQ from the UFS device controller 210 or transmit the data signal DQ to the UFS device controller 210 through the seventh pin P17. A command CMD, an address ADDR, and data DATA may be communicated through the data signal DQ. For example, the data signal DQ may be communicated through data signal lines. In this case, the seventh pin P17 may include multiple pins, respectively corresponding to data signals.

The memory interface circuit 230b may obtain the command CMD from the data signal DQ received in an enable section (e.g., a high level state) of the command latch enable signal CLE on the basis of toggle timings of the write enable signal nWE. The memory interface circuit 230b may obtain the address ADDR from the data signal DQ received in an enable section (e.g., a high level state) of the address latch enable signal ALE on the basis of the toggle timings of the write enable signal nWE.

In some embodiments, the write enable signal nWE may be toggled between the high level and the low level while being maintained in a static state (e.g., the high level or the low level). For example, the write enable signal nWE may be toggled in a section in which the command CMD or the address ADDR is transmitted. Accordingly, the memory interface circuit 230b may obtain the command CMD or the address ADDR on the basis of the toggle timings of the write enable signal nWE.

The memory interface circuit 230b may receive a read enable signal nRE from the UFS device controller 210 through the fifth pin P15. The memory interface circuit 230b may receive a data strobe signal DQS from the UFS device controller 210 or transmit the data strobe signal DQS to the UFS device controller 210 through the sixth pin P16.

During the outputting of data DATA (e.g., a read operation) by the memory device 224, the memory interface circuit 230b may receive the read enable signal nRE which is toggled through the fifth pin P15 before outputting the data DATA. The memory interface circuit 230b may generate the data strobe signal DQS to be toggled on the basis of the toggling of the read enable signal nRE. For example, the memory interface circuit 230b may generate the data strobe signal DQS which is toggled after a predetermined delay (e.g., tDQSRE) based on the toggling start time of the read enable signal nRE. The memory interface circuit 230b may transmit the data signal DQ including the data DATA on the basis of a toggle timing of the data strobe signal DQS. Accordingly, the data DATA may be arranged at the toggle timing of the data strobe signal DQS and transmitted to the UFS device controller 210.

During the of inputting of data DATA (e.g., a write operation or a program operation) by the memory device 224, when the data signal DQ including the data DATA is received from the UFS device controller 210, the memory interface circuit 230b may receive the data strobe signal DQS to be toggled together with the data DATA from the UFS device controller 210. The memory interface circuit 230b may obtain the data DATA from the data signal DQ on the basis of the toggle timing of the data strobe signal DQS. For example, the memory interface circuit 230b may obtain the data DATA by sampling the data signal DQ at rising and falling edges of the data strobe signal DQS.

The memory interface circuit 230b may communicate a ready or busy output signal nR/B to the UFS device controller 210 through the eighth pin P18. The memory interface circuit 230b may communicate state information of the memory device 224 to the UFS device controller 210 through the ready or busy output signal nR/B. When the memory device 224 is in a busy state (e.g., while the internal operations of the memory device 224 are being performed), the memory interface circuit 230b may communicate the ready or busy output signal nR/B indicating the busy state to the UFS device controller 210. When the memory device 224 is in a ready state (e.g., when internal operations being performed by the memory device 224 are not complete), the memory interface circuit 230b may communicate the ready or busy output signal nR/B indicating the ready state to the UFS device controller 210. For example, while the memory device 224 reads the data DATA from the memory cell array 520 in response to a page read command, the memory interface circuit 230b may communicate the ready or busy output signal nR/B indicating the busy state (e.g., at a low level) to the UFS device controller 210. And while the memory device 224 programs the data DATA into the memory cell array 520 in response to a program command, the memory interface circuit 230b may communicate the ready or busy output signal nR/B indicating the busy state to the UFS device controller 210.

The control logic circuit 510 may control various operations performed by the memory device 224. The control logic circuit 510 may receive the command CMD and/or the address ADDR received from the memory interface circuit 230b. The control logic circuit 510 may generate control signals for controlling other components of the memory device 224 in response to the received command CMD and/or the received address ADDR. For example, the control logic circuit 510 may generate control signal(s) for programming the data DATA to the memory cell array 520 or reading the data DATA from the memory cell array 520.

The memory cell array 520 may store the data DATA, received from the memory interface circuit 230b, under the control of the control logic circuit 510. The memory cell array 520 may output the stored data DATA to the memory interface circuit 230b under the control of the control logic circuit 510.

Here, the memory cell array 520 may include memory cells, such as flash memory cells, RRAM cells, ferroelectric random-access memory (FRAM) cells, PRAM cells, thyristor random-access memory (T-RAM) cells, and/or magnetic random-access memory (MRAM) cells. Hereinafter, for purposes of consistent description, it is assumed that the memory cells are NAND flash memory cells.

The UFS device controller 210 may include first to eighth pins P21 to P28 and the controller interface circuit 230a. The first to eighth pins P21 to P28 may correspond to the first to eighth pins P11 to P18 of the memory device 224.

The controller interface circuit 230a may communicate the chip enable signal nCE to the memory device 224 through the first pin P21. The controller interface circuit 230a may communicate signals with the memory device 224, which is selected through the chip enable signal nCE, through the second to eighth pins P22 to P28.

The controller interface circuit 230a may communicate the command latch enable signal CLE, the address latch enable signal ALE, and the write enable signal nWE to the memory device 224 through the second to fourth pins P22 to P24. The controller interface circuit 230a may communicate the data signal DQ to the memory device 224 or receive the data signal DQ from the memory device 224 through the seventh pin P27.

The controller interface circuit 230a may communicate the data signal DQ including the command CMD or the address ADDR to the memory device 224 together with the write enable signal nWE to be toggled. The controller interface circuit 230a may communicate the data signal DQ including the command CMD to the memory device 224 by transmitting the command latch enable signal CLE having an enable state and may communicate the data signal DQ including the address ADDR to the memory device 224 by transmitting the address latch enable signal ALE having an enable state.

The controller interface circuit 230a may communicate the read enable signal nRE to the memory device 224 through the fifth pin P25. The controller interface circuit 230a may receive the data strobe signal DQS from the memory device 224 or transmit the data strobe signal DQS to the memory device 224 through the sixth pin P26.

During the outputting of data DATA by the memory device 224, the controller interface circuit 230a may generate the read enable signal nRE to be toggled and communicate the read enable signal nRE to the memory device 224. For example, the controller interface circuit 230a may generate the read enable signal nRE which is changed from a static state (e.g., a high level or a low level) to a toggled state before the data DATA is output. Accordingly, in the memory device 224, the data strobe signal DQS to be toggled may be generated based on the read enable signal nRE. The controller interface circuit 230a may receive the data signal DQ including the data DATA together with the data strobe signal DQS to be toggled from the memory device 224. The controller interface circuit 230a may obtain the data DATA from the data signal DQ on the basis of the toggle timing of the data strobe signal DQS.

During the inputting of data DATA to the memory device 224, the controller interface circuit 230a may generate the data strobe signal DQS to be toggled. For example, the controller interface circuit 230a may generate the data strobe signal DQS which is changed from a static state (e.g., a high level or a low level) to a toggled state before the data DATA is transmitted. The controller interface circuit 230a may communicate the data signal DQ including the data DATA to the memory device 224 on the basis of the toggle timing of the data strobe signal DQS.

The controller interface circuit 230a may receive the ready or busy output signal nR/B from the memory device 224 through the eighth pin P28. The controller interface circuit 230a may determine the state information of the memory device 224 on the basis of the ready or busy output signal nR/B.

Figure 3:
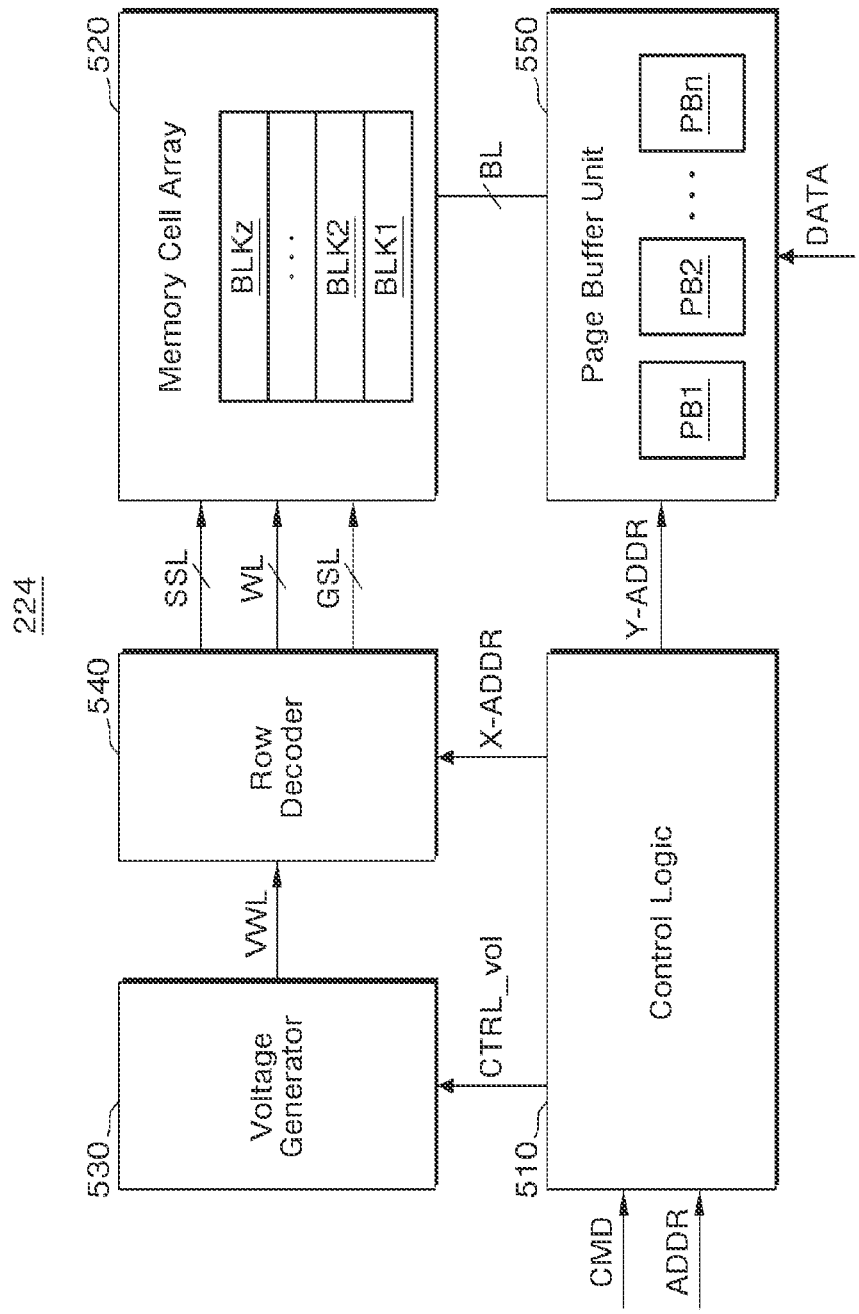
FIG. 3 is a block diagram further illustrating in one example the memory device 224 of FIG. 2.

FIG. 3 is a block diagram further illustrating in one example the memory device 224 of FIG. 2.

Referring to FIG. 3, the memory device 224 may include a control logic circuit 510, a memory cell array 520, a page buffer unit 550, a voltage generator 530, and a row decoder 540. Although not illustrated in FIG. 3, the memory device 224 may further include the memory interface circuit 230b illustrated in FIG. 2 and further include a column logic, a pre-decoder, a temperature sensor, a command decoder, an address decoder, or the like.

The control logic circuit 510 may control various types of overall operations in the memory device 224. The control logic circuit 510 may output various types of control signals in response to a command CMD and/or an address ADDR obtained from the memory interface circuit 230b. For example, the control logic circuit 510 may output a voltage control signal CTRL_vol, a row address X-ADDR, and a column address Y-ADDR.

The memory cell array 520 may include memory blocks BLK1 to BLKz (where 'z' is a positive integer), and each of the memory blocks BLK1 to BLKz may include memory cells. The memory cell array 520 may be connected to the page buffer unit 550 through bit lines BL and connected to the row decoder 540 through word lines WL, string selection lines SSL, and ground selection lines GSL.

In some embodiments, the memory cell array 520 may include a 3D memory cell array and the 3D memory cell array may include NAND strings. Each NAND string may include memory cells each connected to each of word lines vertically stacked on a substrate. In this regard, the collective subject matter of U.S. Pat. Nos. 7,679,133; 8,553,466; 8,654,587; and 8,559,235, as well as published U.S. Patent Application No. 2011/0233648 are hereby incorporated by reference. In some embodiments, the memory cell array 520 may include a 2D memory cell array, and the 2D memory cell array may include NAND strings arranged in row and column directions.

The page buffer unit 550 may include page buffers PB1 to PBn (where 'n' is an integer greater than 2), and each of the page buffers PB1 to PBn may be connected to one of the memory cells through the bit lines BL. The page buffer unit 550 may select at least one of the bit lines BL in response to the column address Y-ADDR. The page buffer unit 550 may be operated as a write driver or a sense amplifier according to an operation mode. For example, when a program operation is performed, the page buffer unit 550 may apply a bit line voltage corresponding to data to be programmed to the selected bit line. When a read operation is performed, the page buffer unit 550 may detect a current or a voltage of the selected bit line to detect data stored in the memory cell.

The voltage generator 530 may generate various types of voltages for performing program, read, and erase operations on the basis of the voltage control signal CTRL_vol. For example, the voltage generator 530 may generate a program voltage, a read voltage, a program verify voltage, an erase voltage, or the like as a word line voltage VWL.

The row decoder 540 may select one of the word lines WL and select one of the string selection lines SSL in response to the row address X-ADDR. For example, when a program operation is performed, the row decoder 540 may apply the program voltage and the program verify voltage to a selected word line, and when a read operation is performed, the row decoder 540 may apply the read voltage to the selected word line.

Figure 4:
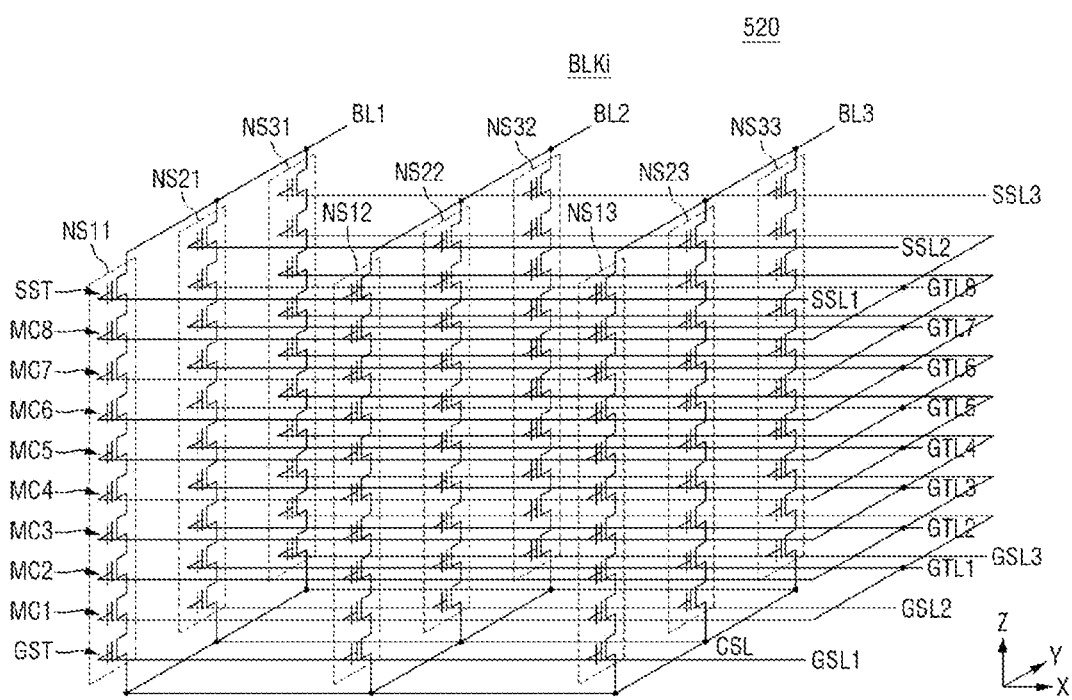
FIG. 4 is a partial equivalent circuit diagram further illustrating a 3D V-NAND structure according to embodiments of the inventive concept.

FIG. 4 is a partial equivalent circuit diagram further illustrating a 3D V-NAND structure according to embodiments of the inventive concept. Referring to FIG. 1, in embodiments wherein the NVM storage module 220 of the UFS device 200 is implemented as a 3D V-NAND type flash memory, each of the memory blocks in the NVM storage module 220 may be understood in relation to the partial equivalent circuit diagram of FIG. 4.

Referring to FIG. 4, a memory block BLKi is representative of the 3D memory blocks of the NVM storage 220. That is, memory NAND strings included in the memory block BLKi may be formed in a direction perpendicular to an underlying (or principal) substrate.

In the illustrated example of FIG. 4, the memory block BLKi includes memory NAND strings NS11 to NS33 disposed to be connected to bit lines BL1, BL2, and BL3 and a common source line CSL. Each of the memory NAND strings NS11 to NS33 may include a string selection transistor SST, memory cells MC1 to MC8, and a ground selection transistor GST. Here, each of the memory NAND strings NS11 to NS33 is shown as including eight (8) memory cells MC1 to MC8, but the scope of the inventive concept is not limited thereto.

Each of the string selection transistors SST may be connected to a corresponding one of string selection lines SSL1, SSL2, and SSL3. Each of the memory cells MC1 to MC8 may be connected to a corresponding one of gate lines GTL1 to GTL8. The gate lines GTL1 to GTL8 may correspond to word lines, and some of the gate lines GTL1 to GTL8 may correspond to dummy word lines. Each of the ground selection transistors GST may be connected to a corresponding one of ground selection lines GSL1, GSL2, and GSL3. Each of the string selection transistors SST may be connected to a corresponding one of the bit lines BL1, BL2, and BL3, and the ground selection transistors GST may be connected to the common source line CSL.

The word lines (e.g., WL1) at the same level may be commonly connected, and the ground selection lines GSL1, GSL2, and GSL3 and the string selection lines SSL1, SSL2, and SSL3 may be separated individually. In FIG. 4, the memory block BLKi is illustrated as being connected to eight gate lines GTL1 to GTL8 and three bit lines BL1, BL2, and BL3, but the inventive concept is not limited thereto.

Figures 5, 6:
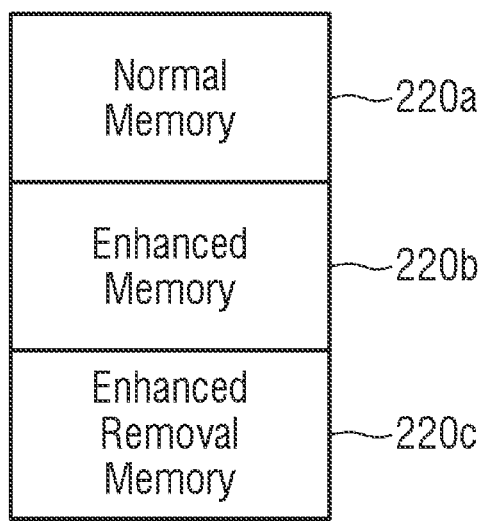

FIG. 5 is a block diagram further illustrating in one example a configuration of the NVM storage 220 including storage regions recognizable by the UFS device controller 210 and the UFS host controller 110 of FIG. 1.

Referring to FIGS. 1 and 5, the storage regions of the NVM storage 220 may include a normal memory region 220a, an enhanced memory region 220b, and a purge region 220c. That is, the UFS device controller 210 and the UFS host controller 110 may control (e.g., divide, designate, logically-partition, expand, consolidate, etc.) and recognize (e.g., address, access, house-keep, etc.) the various storage regions of the NVM storage 220 (e.g., the normal memory region 220a, the enhanced memory region 220b, and the purge region 220c). In this regard, in some embodiments, the normal memory region 220a, the enhanced memory region 220b, and the purge region 220c may be respective, physically separated regions, and/or logically (or non-physically) designated regions.

In some embodiments, the normal memory region 220a, the enhanced memory region 220b, and the purge region 220c may be defined according to different storage units 221 of the NVM storage 220. Alternately, the normal memory region 220a, the enhanced memory region 220b, and the purge region 220c may be defined within a single storage unit 221, or defined across a number of storage units 221.

Given this configuration and within this context, the enhanced memory region 220b may be a region enabling faster data access operations (e.g., read and write operations) than the data access operations performed in relation to the normal memory region 220a. Thus, in some embodiments, the enhanced memory region 220b may include SLC while the normal memory region 220a may include MLC. Alternately, in some embodiments, the enhanced memory region 220b may include QLC while the normal memory region 220a may include SLC and/or MLC.

The purge region 220c may be a region managed by the UFS device controller 210 and/or the UFS host controller 110 to efficiently perform a purge operation.

That is, the UFS device controller 210 and/or the UFS host controller 110 may store data-scheduled-to-be-purged (hereafter, "purge data") in the purge region 220c. Here, the purge data may be data that should be periodically deleted during routine operation of the memory system 1.

For example, certain key values (e.g., encrypted or decrypted key values) used during the reading of data from the normal memory region 220a or the enhanced memory region 220b should be continuously updated. Thus, previously used, but no longer valid, key values (hereafter, "old key values") still stored in the NVM storage 220 should be erased to protect the memory system 1 from security attacks. Accordingly, such old key values should be periodically erased (i.e., physically deleted). In some embodiments, old key values may be stored in the purge region 220c as purge data, such that a purge operation may be performed, upon specific command or in accordance with a defined period, on the purge region 220c.

Here, an example of old key values has been described, but those skilled in the art will recognize that many types of purge data are susceptible to the efficient removal capabilities provided by embodiments of the inventive concept.

Figure 8:
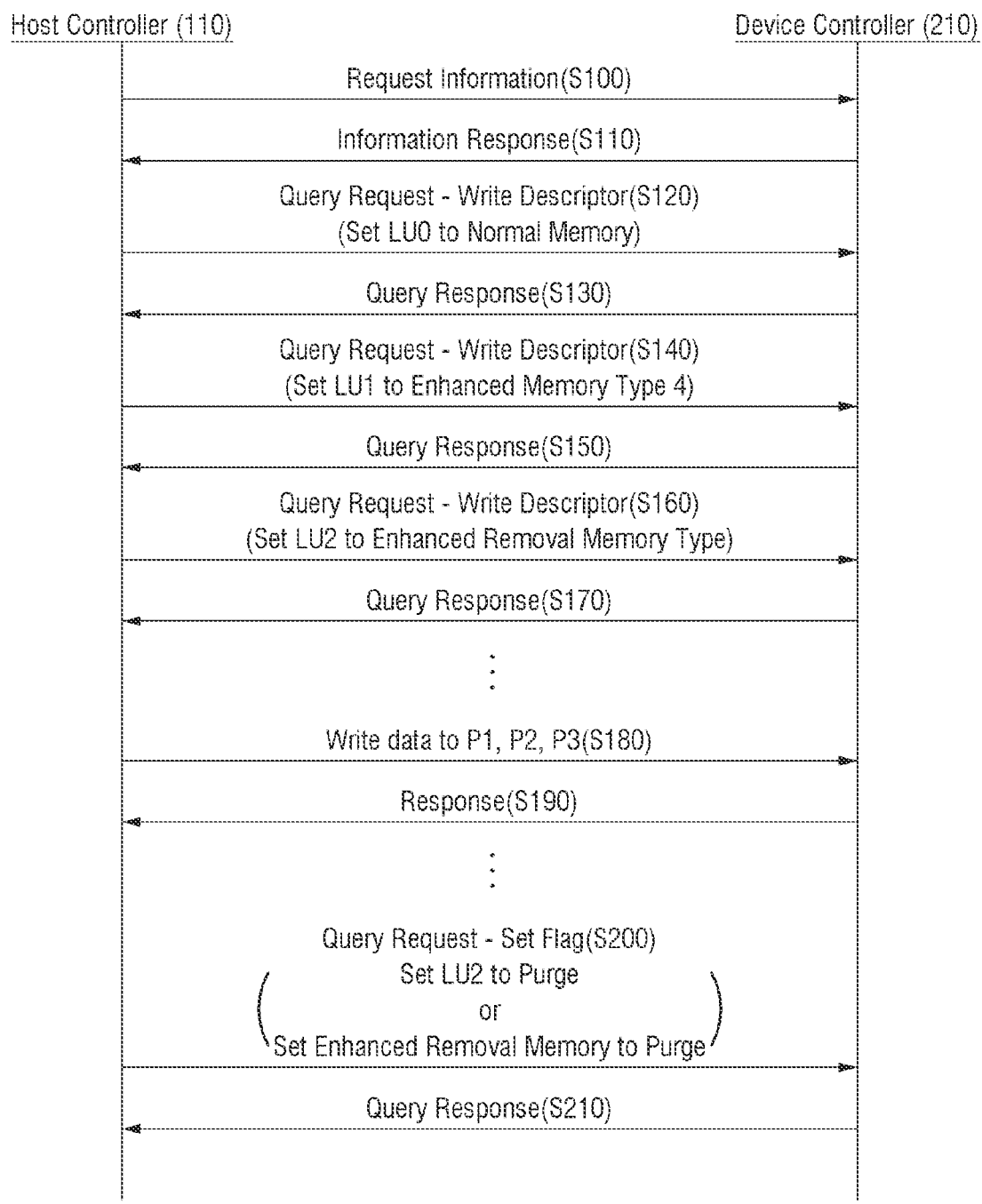

Hereinafter, an exemplary purge operation will be described in some additional detail with reference to FIGS. 6, 7, 8, 9, 10, 11 and 12 (collectively, "FIGS. 6 to 12"), wherein FIG. 6 is a diagram illustrating a listing of memory types of non-volatile storages supported by memory systems according to embodiments of the inventive concept, FIG. 7 is a diagram illustrating a geometry descriptor supported by memory systems according to embodiments of the inventive concept, FIG. 8 is a flow diagram illustrating a purge operation according to embodiments of the inventive concept, and FIGS. 9 to 12, inclusive, are respective diagrams further illustrating the purge operation of FIG. 8.

Referring to FIG. 6, in order to efficiently perform a purge operation, an enhanced removal memory type corresponding to the purge region 220c of FIG. 2 should be defined for memory command, memory control and memory allocation purposes. Thus, FIG. 6 is an example in which the enhanced removal memory type has been added to a field (e.g., "wSupportedMemoryTypes") as '07 h' assuming the use of the UFS standard by the memory system 1 of FIG. 1.

Referring to FIG. 7, in order to efficiently perform the purge operation, a field (e.g., "dEnhancedRemovalMaxNAllocU") indicating a maximum number of units allocable to the purge region 220c and another field (e.g., "wEnhancedRemovalCapAdjFac") for setting a capacity adjustment factor are added. Here, the field "dEnhancedRemovalMaxNAllocU" indicating the maximum number of units allocable to the purge region 220c may include size information for the purge region in which the purge operation for the entirety of the purge region may be completed within a predetermined period of time (hereafter, "purge time"). That is, the field "dEnhancedRemovalMaxNAllocU" may include the maximum number of LUs allocatable to the purge region 220c during the purge operation, such that the entirety of the purge region may be purged (deleted) during the purge time. In this regard, the illustrated example of FIG. 7 shows fields being added to a geometry descriptor assuming the use of the UFS standard, but embodiments of the inventive concept are not limited thereto.

Referring to FIGS. 1, 5, and 8 in relation to the exemplary purge operation, the UFS host controller 110 requests information about the purge region 220c from the UFS device controller 210 (S100).

When the UFS device controller 210 receives this request, the UFS device controller 210 communicates information describing or related to the purge region 220c of the NVM storage 220 (hereafter, wholly or in part, "purge information") to the UFS host controller 110 (S110).

In this case, the purge information communicated by the UFS device controller 210 to the UFS host controller 110 may include the fields "dEnhancedRemovalMaxNAllocU" and "wEnhancedRemovalCapAdjFac" described above in relation to FIG. 7.

Next, the UFS host controller 110 communicates a request for allocating a partition P1 for a LU LU0 to the normal memory region 220a to the UFS device controller 210 (S120). In this case, the UFS host controller 110 may communicate (e.g.) a query including a memory type, 00 h, as illustrated in FIG. 6 to the UFS device controller 210.

Figure 9:
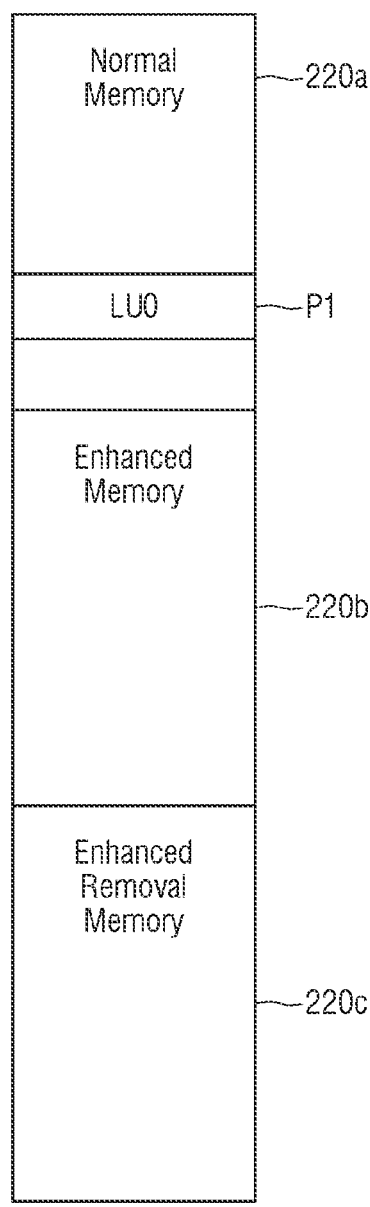

In response to the query, the UFS device controller 210 may allocate the partition P1 for the LU LU0 to the normal memory region 220a as illustrated in FIG. 9 and may respond that the allocation is completed to the UFS host controller 110 (S130).

Next, the UFS host controller 110 communicates a request for allocating a partition P2 for a LU LU1 to the enhanced memory region 220b to the UFS device controller 210 (S140). In this case, the UFS host controller 110 may communicate (e.g.) a query including a memory type, 06 h, as illustrated in FIG. 6 to the UFS device controller 210.

Figure 10:
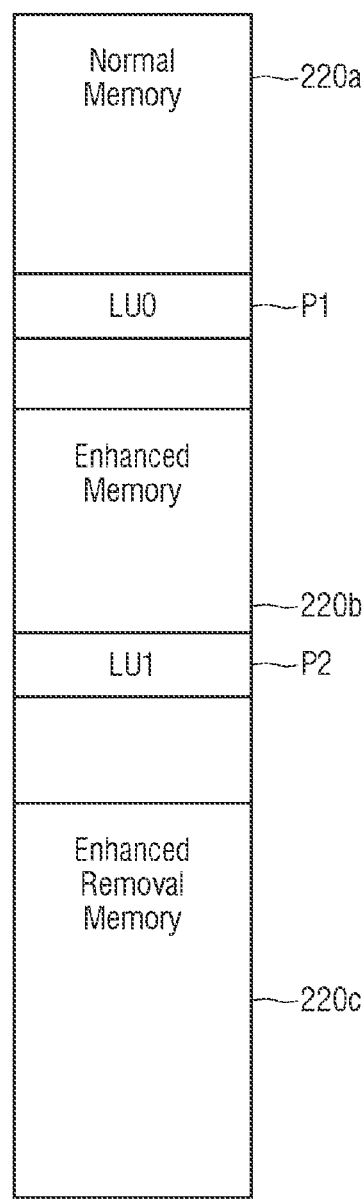

In response to the query, the UFS device controller 210 may allocate the partition P2 for the LU LU1 to the enhanced memory region 220b as illustrated in FIG. 10 and may respond that the allocation is complete to the UFS host controller 110 (S150).

Next, the UFS host controller 110 communicates a request for allocating a partition P3 for a LU LU2 to the purge region 220c to the UFS device controller 210 on the basis of the purge information (e.g., the information provided in S110) provided by the UFS device controller 210 (S160).

In this case, the UFS host controller 110 may communicate (e.g.) a query including a memory type, 07 h, as illustrated in FIG. 6 to the UFS device controller 210, and the UFS host controller 110 may request the partition allocation from the UFS device controller 210 on the basis of the size information included in the purge information.

Figure 11:
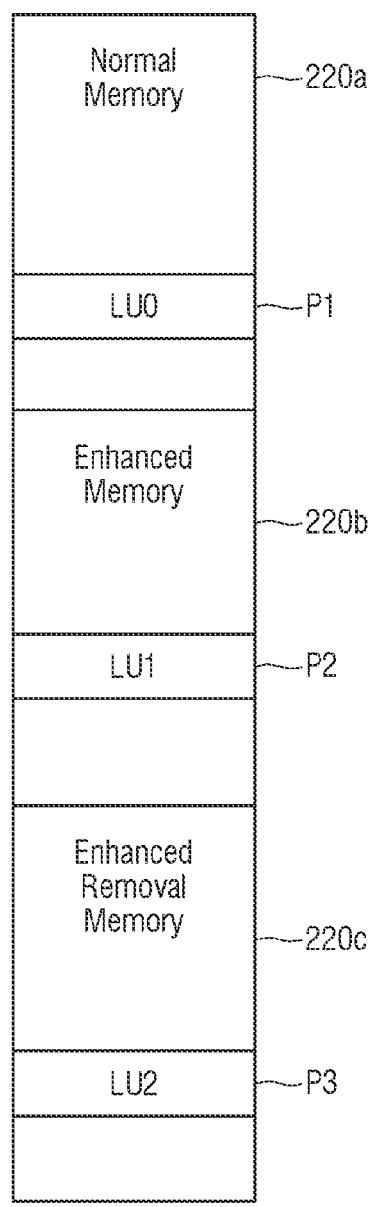

In response to the query, the UFS device controller 210 may allocate the partition P3 for the LU LU2 to the purge region 220c as illustrated in FIG. 11 and may respond that the allocation is complete to the UFS host controller 110 (S170).

Next, the UFS host controller 110 communicates respective data to be stored in the partitions P1, P2 and P3, as allocated by the NVM storage 220 to the UFS device controller 210 (S180). In this case, old key values may be stored in the partition P3 allocated to the purge region 220c as previously stored by the UFS host controller 110 and/or the UFS device controller 210.

As the UFS device controller 210 receives data from the UFS host controller 110, the UFS device controller 210 may selectively store the received data according to the allocated partitions P1, P2 and P3, and then respond that the data storage is complete to the UFS host controller 110 (S190). Accordingly, old key values (as one example of purge data) may be appropriately stored in the purge region 220c of the NVM storage 220.

Next, the UFS host controller 110 communicates a purge request to the UFS device controller 210 (S200).

In some embodiments, this communicating of the purge request may include target information indicating target region(s) (e.g., one or more "purge region(s)") of the NVM storage 220 to be purged. That is, referring to FIG. 12, a field of "SET FLAG OPCODE" associated with the purge request may be communicated to the UFS device controller 210 from the UFS host controller 110 including an index field 14 and a selector field 15. Here, as one example, the selector field 15 may indicate a type of the target region(s) to be purged, and the index field 14 may include information for indexing the target region(s) to be purged. For example, when the selector field 15 is 01 h, it may mean that the target region to be purged is a partition indexed by the index field 14 among the partitions allocated to the purge region 220c. That is, for example, when the selector field 15 is 01 h and the index field 14 is 03 h, it may denote that the partition (e.g., LU2) allocated to the purge region 220c should be purged.

Alternately, when the selector field 15 is 02 h, it may mean that the target region(s) to be purged are the memory regions 220a to 220c indexed by the index field 14 among the memory regions 220a to 220c of the NVM storage 220. That is, when the selector field 15 is 02 h and the index field 14 is 07 h, it may mean that the entirety of the purge region 220c should be purged.

Alternately, bits included in the index field 14 may include both the type of the target region(s) to be purged and information for indexing the target region(s) to be purged. That is, the UFS host controller 110 may communicate the type of the target region(s) to be purged and the information for indexing the target region(s) to be purged to the UFS device controller 210 using only the index field 14, without using the selector field 15. In this case, for example, first bits among the bits of the index field 14 may indicate the type of the target region(s) to be purged, and second bits among the bits of the index field may be used to index the target to region(s) be purged.

Thus, the UFS device controller 210 receiving a purge request from the UFS host controlled 110 may perform a purge operation according to embodiments of the inventive concept.

That is, for example, when the UFS host controller 110 requests a purge operation be performed for a specific partition in the purge region 220c, the UFS device controller 210 may check a selector field 15 and an index field 14 in a field for SET FLAG OPCODE of a query command and selectively perform the purge operation on only the indicated partition. Alternately, the UFS device controller 210 may check only the index field 14 in the field for SET FLAG OPCODE of the query command and selectively perform the purge operation on only the indicated partition.

When the UFS host controller 110 requests a purge operation be performed on the entirety of the purge region 220c, the UFS device controller 210 may check the selector field 15 and the index field 14 in the field for SET FLAG OPCODE of the query command and perform the purge operation on the entirety of the purge region 220c. Alternately, the UFS device controller 210 may check only the index field 14 in the field for SET FLAG OPCODE of the query command and perform the purge operation on the entirety of the purge region 220c.

Thereafter, the UFS device controller 210 may respond that the purge operation is completed to the UFS host controller 110 (S210).

The foregoing embodiments of the inventive concept, and related modifications thereof, have been developed in response to demands for methods that efficiently (e.g., rapidly) purge (i.e., physical erase) only data deemed sensitive (or purge-worthy) by a user (e.g., old security data, such as old key values) in an conventional context wherein available purge interfaces make such rapid purging impossible. This result conventionally arises because logical-to-physical (L2P) mapping information must be re-checked during (or before) execution of a purge operation. In fact, such slow purge operations and related interfaces makes may actual make sensitive data more difficult to physically erase, leading to security problems.

Against this technical backdrop, embodiments of the inventive concept address the problems associated with efficiently purging sensitive data. In this regard, a host device may selectively store only purge data (e.g., sensitive data having one or more purge-specific attributes) in a partition, and thereafter request (or schedule) performance of a purge operation with respect to the stored purge data. Accordingly, it is possible to perform a purge operation at relatively high speed and with improved efficiency.

Those skilled in the art will appreciate that many variations and modifications may be made to the illustrated embodiments without substantially departing from the scope of the inventive concept as defined by the following claims.

What is claimed is:

1. A method of operating a memory device in a memory system including a host device and the memory device, wherein the memory device includes a non-volatile storage including a purge region and a memory region, the method comprising:
   communicating purge information associated with the purge region in response to a request from the host device for purge information;
   allocating a first partition for a first logical unit in the purge region in response to a request from the host device for generating the first partition for the first logical unit in the purge region; and
   performing a purge operation on the first partition or an entirety of the purge region in response to a purge request from the host device including information indicating a target region to be purged,
   wherein the information indicating the target region to be purged includes an index field and a selector field, the selector field indicating a type of the target region to be purged, and the index field includes information for indexing the target region to be purged,
   the performing of the purge operation includes performing the purge operation on the first partition indicated by the index field, if the selector field includes first data, and
   the performing of the purge operation includes performing the purge the performing of the purge operation includes performing the purge operation on the entirety of the purge region indicated by the index field, if the selector field includes second data different from the first data.

2. The method of claim 1, wherein the purge information includes size information of the purge region, and
   the performing of the purge operation on the entirety of the purge region is completed within a purge time.

3. The method of claim 2, wherein the request from the host device for generating the first partition for the first logical unit in the purge region is based on the size information of the purge region.

4. The method of claim 1, further comprising:
   allocating a second partition for a second logical unit to the memory region of the non-volatile storage in response to a request from the host device for generating the second partition for the second logical unit in the memory region.

5. The method of claim 4, wherein the memory region includes a normal memory region and an enhanced memory region, and
   the allocating of the second partition for the second logical unit to the memory region of the non-volatile storage comprises:
   allocating a third partition for a third logical unit to the normal memory region of the non-volatile storage in response to a request from the host device for generating the third partition for the third logical unit in the normal memory region; and
   allocating a fourth partition for a fourth logical unit to the enhanced memory region of the non-volatile storage in response to a request from the host device for generating the fourth partition for the fourth logical unit in the enhanced memory region.

6. The method of claim 1, wherein the index field includes bits, and
   first bits among the bits indicate a type of the target region to be purged, and second bits among the bits index the target region to be purged.

7. A memory system comprising:
   a host device including a host controller; and
   a memory device including a device controller and a non-volatile storage including a purge region and a memory region,
   wherein the device controller is configured to communicate purge information associated with the purge region and including size information of the purge region to the host controller,
   wherein the host controller is configured to communicate a request for generating a first partition for a first logical unit in the memory region to the device controller, to communicate a request for generating a second partition for a second logical unit in the purge region in response to the size information of the purge region to the device controller, and to communicate purge data to the memory device for storage in the second partition,
   wherein the device controller is further configured to complete a purge operation for an entirety of the purge region within a defined purge time in response to a purge request from the host controller, and
   wherein the host controller is further configured to communicate data to be stored in the first partition to the device controller, and the purge data comprises old key values.

8. The memory system of claim 7, wherein the memory region includes a normal memory region and an enhanced memory region,
   the host controller is further configured to communicate to the device controller a request for generating a third partition for a third logical unit in the normal memory region, and
   the host controller is further configured to communicate to the device the host controller is further configured to communicate to the device controller a request for generating a fourth partition for a fourth logical unit in the enhanced memory region.

9. The memory system of claim 7, wherein the host controller is further configured to communicate the purge request including information indicating one of the first partition and the entirety of the purge region to the device controller.

10. The memory system of claim 9, wherein the information indicating one of the first partition and the entirety of the purge region includes an index field and a selector field,
    the selector field indicates one of the first partition and the entirety of the purge region as a target region to be purged, and
    the index field includes information for indexing the target region.

11. The memory system of claim 9, wherein the information indicating one of the first partition and the entirety of the purge region includes an index field including bits,
    first bits among the bits indicate one of the first partition and the entirety of the purge region as a target region to be purged, and
    second bits among the bits index the target region.

12. The memory system of claim 7, wherein:
    the host device includes a Universal Flash Storage (UFS) host device;

the memory device includes a UFS memory device; and
the host device and the memory device communicate through an UFS interface.

\* \* \* \* \*